United States Patent
Yasuda et al.

(10) Patent No.: US 12,388,528 B2
(45) Date of Patent: Aug. 12, 2025

(54) OPTICAL TRANSMITTER AND OPTICAL TRANSMISSION SYSTEM

(71) Applicant: Yazaki Corporation, Tokyo (JP)

(72) Inventors: Hiroki Yasuda, Kanagawa (JP);
Takamitsu Aiba, Kanagawa (JP);
Tomohiro Wakabayashi, Kanagawa (JP)

(73) Assignee: YAZAKI CORPORATION, Tokyo (JP)

( * ) Notice: Subject to any disclaimer, the term of this patent is extended or adjusted under 35 U.S.C. 154(b) by 247 days.

(21) Appl. No.: 18/338,898

(22) Filed: Jun. 21, 2023

(65) Prior Publication Data

US 2023/0421263 A1 Dec. 28, 2023

(30) Foreign Application Priority Data

Jun. 27, 2022 (JP) .................................. 2022-102420

(51) Int. Cl.
*H04B 10/2581* (2013.01)
*H04B 10/50* (2013.01)

(52) U.S. Cl.
CPC ....... *H04B 10/2581* (2013.01); *H04B 10/505* (2013.01)

(58) Field of Classification Search
CPC .................................................. H04B 10/505
USPC ........................................................ 398/143
See application file for complete search history.

(56) References Cited

U.S. PATENT DOCUMENTS

| | | | |
|---|---|---|---|
| 5,448,674 A | 9/1995 | Vengsarkar et al. | |
| 6,535,678 B1 | 3/2003 | Yamauchi et al. | |
| 9,322,989 B2 * | 4/2016 | Fini ...................... | G02B 6/0288 |
| 10,730,785 B2 * | 8/2020 | Brown .................... | C03B 40/00 |
| 2010/0329605 A1* | 12/2010 | Graham .................. | G02B 3/02 |
| | | | 385/33 |
| 2011/0002694 A1* | 1/2011 | Maejima ............ | H04B 10/2581 |
| | | | 398/143 |
| 2012/0128299 A1 | 5/2012 | Engelberth | |
| 2020/0161826 A1 | 5/2020 | Mimuro | |
| 2020/0264365 A1 | 8/2020 | Koike et al. | |
| 2021/0041728 A1 | 2/2021 | Saito et al. | |

FOREIGN PATENT DOCUMENTS

| | | | | |
|---|---|---|---|---|
| AU | 2010260367 A1 * | 2/2012 | .......... | G02B 6/4472 |
| JP | 7-270636 A | 10/1995 | | |
| JP | 2000-347057 A | 12/2000 | | |
| JP | 2011-134735 A | 7/2011 | | |
| JP | 2018-190834 A | 11/2018 | | |
| JP | 2019-40002 A | 3/2019 | | |
| JP | 2019-49658 A | 3/2019 | | |

(Continued)

*Primary Examiner* — Amritbir K Sandhu
(74) *Attorney, Agent, or Firm* — Sughrue Mion, PLLC

(57) ABSTRACT

An optical transmitter includes: a light emitting part that emits light; and a lens that condenses the light emitted from the light emitting part. Further, the optical transmitter includes a multimode optical fiber that is optically coupled to the lens at one end and on which the light that is condensed by the lens is incident. Furthermore, the coefficient of the correlation between the distribution of the intensity of the light in the light emitting part and the distribution of the intensity of return light to the light emitting part, when the light is emitted from the light emitting part, is set to 0.5 or less.

10 Claims, 5 Drawing Sheets

(56) References Cited

FOREIGN PATENT DOCUMENTS

| | | | | |
|---|---|---|---|---|
| JP | 2021-028680 A | | 2/2021 | |
| WO | WO-2018163936 A1 | * | 9/2018 | ....... B29D 11/00442 |
| WO | WO-2018198511 A1 | * | 11/2018 | ......... H04B 10/2581 |
| WO | WO-2019026906 A1 | * | 2/2019 | ......... H04B 10/2507 |
| WO | 2021/067880 A1 | | 4/2021 | |

* cited by examiner

OPTICAL TRANSMITTER AND OPTICAL TRANSMISSION SYSTEM

CROSS-REFERENCE TO RELATED APPLICATIONS

The present application is based on, and claims priority from the prior Japanese Patent Application No. 2022-102420, filed on Jun. 27, 2022, the entire contents of which are incorporated herein by reference.

TECHNICAL FIELD

The present disclosure relates to an optical transmitter and an optical transmission system.

BACKGROUND

Conventionally, an optical transmission system has been known in which an electrical signal is converted into an optical signal by a laser provided in an optical transmitter, and the optical signal is transmitted via an optical fiber to a photodiode that is provided in an optical receiver, and is converted into an electrical signal, thereby transmitting a signal.

In recent years, in a system that optically transmits digital signals, the speed of signals that are transmitted has been increasing (for example, transmission at 10 Gbit/s or faster), and thus it is desirable to achieve faster signal transmission more stably by achieving high-quality signal transmission with reduced noise. Further, a system that transmits radio frequency (RF) signals, such as radio on fiber (RoF), is more susceptible to noise, and thus it is desirable to reduce noise in an optical transmission system as much as possible.

One type of noise that affects the signal quality of such an optical transmission system is the effect on the noise characteristics (RIN: relative intensity noise) caused by return light to the laser side. For this reason, reducing the return light to the laser side makes it possible to improve the signal quality of an optical transmission system.

Therefore, as disclosed in JP 2021-028680 A, a configuration has been proposed in which an optical isolator is used to reduce the return light to the laser side.

SUMMARY OF THE INVENTION

However, if the return light is reduced by using an optical isolator as in the above prior technology, the optical transmission system increases in size and cost.

An object of the disclosure is to provide an optical transmitter and an optical transmission system that are capable of achieving a reduction in size and cost and of suppressing degradation of signal quality due to noise.

An optical transmitter according to an embodiment includes: a light emitting part that emits light; a lens that condenses the light emitted from the light emitting part; and a multimode optical fiber that is optically coupled to the lens at one end and on which the light that is condensed by the lens is incident. A coefficient of a correlation between a distribution of an intensity of the light in the light emitting part and a distribution of an intensity of return light to the light emitting part, when the light is emitted from the light emitting part, is set to 0.5 or less.

An optical system according to an embodiment includes: the optical transmitter; an optical receiver that receives light that is transmitted from the optical transmitter; and an optical fiber that transmits the light that is transmitted from the optical transmitter to the optical receiver.

The above configuration makes it possible to provide an optical transmitter and an optical transmission system that are capable of achieving a reduction in size and cost and of suppressing degradation of signal quality due to noise.

BRIEF DESCRIPTION OF DRAWINGS

FIG. 1 is a diagram schematically illustrating an example of an optical transmission system.

FIG. 2 illustrates an example of the optical transmission system by dividing the optical transmission system into an optical transmitter, an optical fiber, and an optical receiver.

FIG. 8 is a diagram illustrating the distribution of the intensity of light in the light emitting part when light is emitted from the light emitting part, and the distribution of the intensity of return light to the light emitting part, in a normalized distribution state.

DETAILED DESCRIPTION OF THE INVENTION

Figure 3:
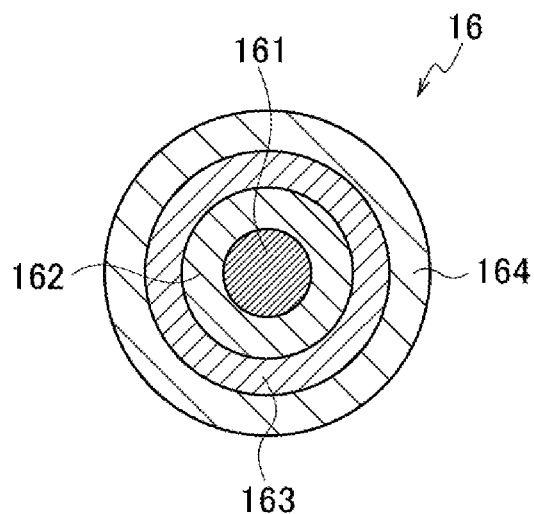
FIG. 3 is a cross-sectional view schematically illustrating a multimode optical fiber that is provided in the optical transmitter.

Various embodiments will be described hereinafter with reference to the accompanying drawings.

Hereafter, an optical transmitter and an optical transmission system according to the present embodiment will be described in detail with reference to the drawings. Note that the dimensional ratios in the drawings are exaggerated for the sake of the explanation and may differ from the actual ratios.

Figures 1, 2:
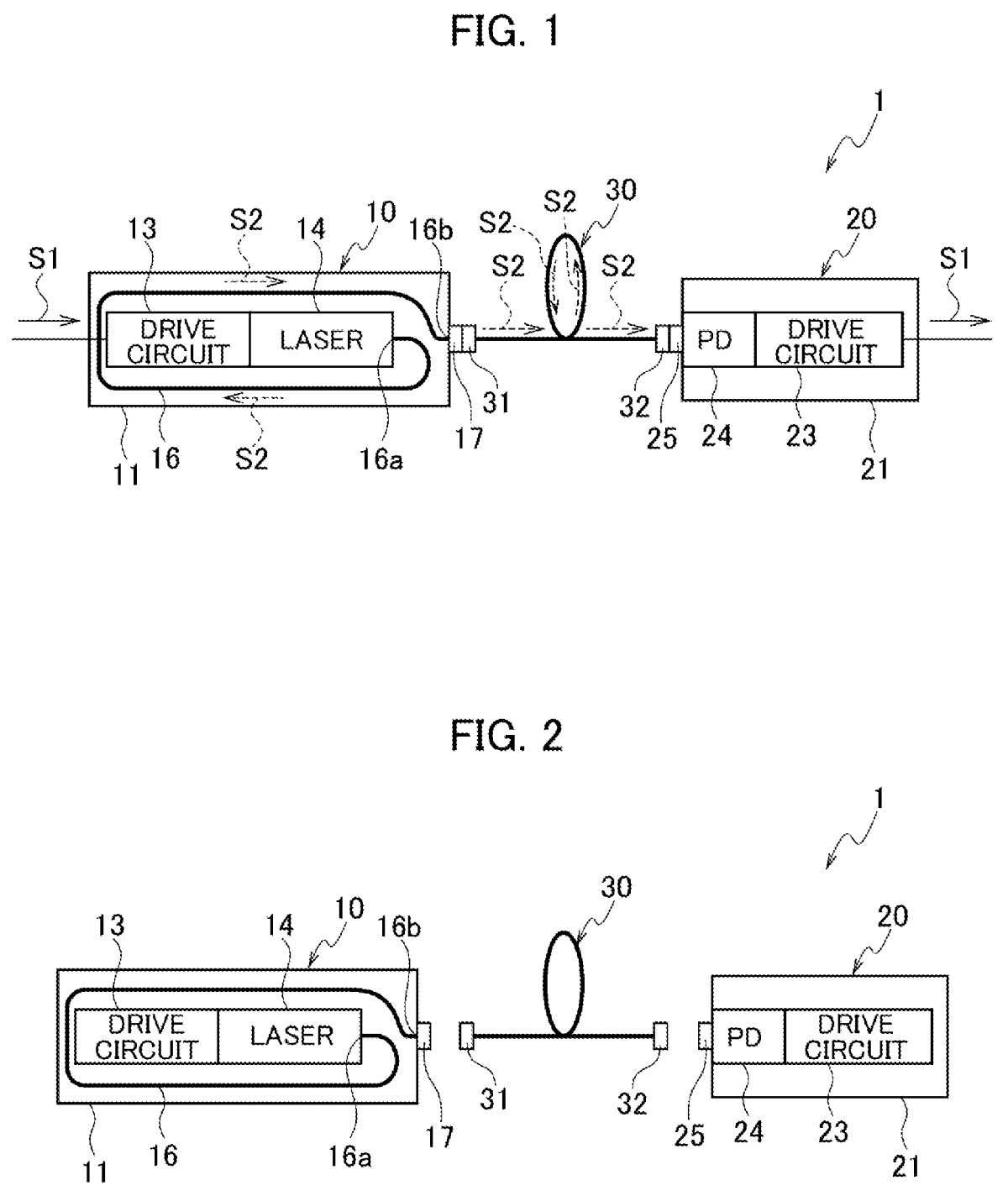

As illustrated in FIGS. 1 and 2, an optical transmission system 1 according to the present embodiment includes: an optical transmitter 10 that is capable of transmitting an optical signal (light) S2; and an optical receiver 20 that is capable of receiving the optical signal S2 transmitted from the optical transmitter 10.

In addition, the optical transmission system 1 includes an optical fiber 30 that is optically coupled to the optical transmitter 10 at one end and optically coupled to the optical receiver 20 at the other end, and transmits the optical signal S2 that is transmitted from the optical transmitter 10 to the optical receiver 20.

The optical transmitter 10 includes a laser (light emitting part) 14 that converts an electrical signal S1 into the optical signal (light) S2, and a drive circuit 13 that drives the laser 14. In addition, the optical receiver 20 includes a photodiode (PD) 24 that converts the optical signal (light) S2 into the electrical signal S1, and a drive circuit 23 that drives the photodiode (PD) 24.

The optical transmitter 10 is connected to a network device or the like, and the optical receiver 20 is connected to another network device or the like, and thus signals from the network device on the side of the optical transmitter 10 are transmitted to the network device on the side of the optical receiver 20 via the optical transmission system 1.

Specifically, the electrical signal S1 that is transmitted from the network device or the like on the side of the optical transmitter 10 to the optical transmitter 10 is converted into the optical signal S2 by the laser 14 driven by the drive circuit 13. The optical signal S2 that is converted from the electrical signal S1 is emitted from the laser 14 to be incident on the optical fiber 30, and transmitted to the optical receiver 20 via the optical fiber 30. The optical signal S2 that is transmitted to the optical receiver 20 is converted into the electrical signal S1 by the photodiode (PD) 24 driven by the drive circuit 23, and the converted electrical signal S1 is transmitted to a device such as the network device on the side of the optical transmitter 10.

Accordingly, the optical transmission system 1 transmits signals by converting the electric signal S1 into the optical signal S2 by means of the laser 14 of the optical transmitter 10, and transmitting the optical signal S2 to the photodiode 24 of the optical receiver 20 via the optical fiber 30 to convert the optical signal S2 into the electric signal S1.

The optical transmission system 1 having such a configuration can be used in a system that transmits digital signals or a system that transmits radio frequency (RF) signals such as radio on fiber (RoF). That is, the optical transmission system 1 according to the present embodiment can be used for various applications such as broadcasting, communication, infrastructure, and EMC (e.g. television/radio broadcast waves, cellular telephones, GPS, Bluetooth, and Wi-Fi).

The optical transmitter 10 is provided with a case 11 in which the laser 14 and the drive circuit 13 described above are housed. In addition, a multimode optical fiber (HMC-Fiber) 16 for transmitting the optical signal S2 that is emitted from the laser 14 is housed in the case 11, and an optical connector 17 is attached to the outside of the case 11 in an exposed state. Further, the optical signal S2 that is transmitted by the multimode optical fiber 16 is transmitted to the optical fiber 30 via the optical connector 17 by coupling the optical fiber 30 to the optical connector 17.

The multimode optical fiber 16 is an optical fiber having a plurality of modes that propagate light, and includes a core 161 and cladding 162 that is arranged on the outer periphery of the core 161, as illustrated in FIG. 3. The multimode optical fiber 16 also includes a tension member 163 that is arranged on the outer periphery of the cladding 162, and a jacket 164 that is arranged on the outer periphery of the tension member 163 (see FIG. 3).

The core 161 has a function of transmitting the optical signal S2 and is made of quartz glass or plastic. For example, the core 161 has a diameter of 50 micrometers, 62.5 micrometers, 100 micrometers, or the like. The refractive index of the core 161 may be the same from the center to the outer periphery, or may change smoothly from the center to the outer periphery.

The cladding 162 is made of a material with a lower refractive index than the core 161, and has a function of refracting the optical signal S2 that is incident into the core 161. In addition, the tension member 163 has a function of relaxing the tension or the like that is applied to the core 161 when laying the multimode optical fiber 16. The jacket 164 has a function of protecting the core 161 and the cladding 162.

Figure 4:
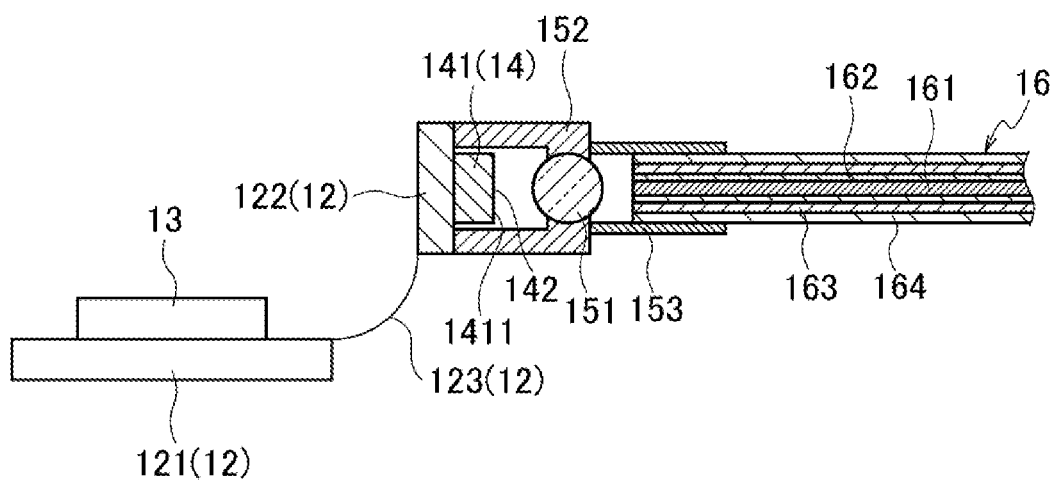
FIG. 4 is a diagram schematically illustrating an example of a coupling method between a light emitting part and the multimode optical fiber that are provided in the optical transmitter.

The multimode optical fiber 16 having such a configuration can be optically coupled to the laser 14 by using, for example, the configuration illustrated in FIG. 4.

Specifically, the optical transmitter 10 includes a lens 151 that is capable of condensing the optical signal S1 that is emitted from the laser 14, and one end 16a of the multimode optical fiber 16 is optically coupled to the lens 151. Accordingly, the multimode optical fiber 16 is optically coupled to the laser 14 via the lens 151, and the optical signal S1 that is emitted from the laser 14 and condensed by the lens 151 is incident into the core 161.

In the configuration illustrated in FIG. 4, the drive circuit 13 and the laser 14 are mounted on a substrate 12. Specifically, the substrate 12 includes a first substrate 121 on which the drive circuit 13 is mounted, a second substrate 122 on which the laser 14 is mounted, and an FPC substrate 123 that connects the first substrate 121 and the second substrate 122 with each other. Thus, the drive circuit 13 and the laser 14 are electrically connected with each other via the first substrate 121, the FPC substrate 123, and the second substrate 122.

Various types of drive circuits 13 may be used. For example, the drive circuit 13 can be formed using a chip IC, or the drive circuit 13 can be formed using a bias tee, which is a combination of a chip coil and a chip inductor.

In addition, various types of lasers 14 may be used. In the configuration illustrated in FIG. 4, a vertical-cavity surface-emitting laser (VCSEL) driven by direct modulation is used as the laser 14.

The laser 14, for example, includes an approximately cylindrical body 141, and an emission part 142 that emits the converted optical signal S2 is formed in the body 141 such that an emission surface 142a is positioned on one surface 1411 of the body 141.

In addition, a lens holding wall 152 is fixed to the second substrate 122 on which the laser 14 is mounted, and the lens 151 is held on the lens holding wall 152 in a state in which the lens 151 is separated from the emission surface 142a by a predetermined distance and faces the emission surface 142a.

A coupling wall 153 is formed on the lens holding wall 152, and the coupling wall 153 is configured to hold one end 16a of the multimode optical fiber 16 and optically couple the multimode optical fiber 16 to the lens 151.

Accordingly, the optical signal S2 that is emitted from the emission surface 142a of the laser 14 is condensed by the lens 151 and to be incident into the core 161 of the multimode optical fiber 16.

Figure 5:
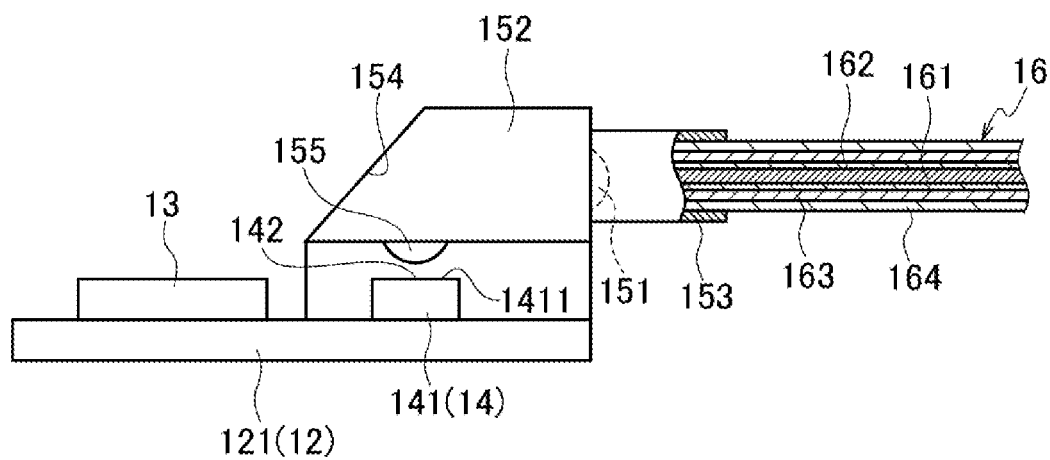
FIG. 5 is a diagram schematically illustrating another example of a coupling method between the light emitting part and the multimode optical fiber that are provided in the optical transmitter.

In addition, the multimode optical fiber 16 may be optically coupled to the laser 14 as in the configuration illustrated in FIG. 5.

In the configuration illustrated in FIG. 5, the drive circuit 13 and the laser 14 are mounted on the single substrate 12. Further, in the configuration illustrated in FIG. 5, a reflecting mirror 154 and a condenser lens 155 are provided on the lens holding wall 152, and the condenser lens 155 is held on the lens holding wall 152 in a state in which the condenser lens 155 is separated from the emission surface 142*a* by a predetermined distance and faces the emission surface 142*a*. Further, the optical signal S2 that is emitted from the emission surface 142*a* is reflected by the reflecting mirror 154 in a state in which the optical signal S2 is condensed by the condenser lens 155, and thus the light path is bent by 90 degrees. Further, the lens 151 is held on the lens holding wall 152 in a state in which the optical signal S2 reflected by the reflecting mirror 154 can pass through, and one end 16*a* of the multimode optical fiber 16 is held on the coupling wall 153. Accordingly, the multimode optical fiber 16 is optically coupled to the lens 151. In addition, the optical signal S2 that is emitted from the emission surface 142*a* and reflected by the reflecting mirror 154 via the condensing lens 155 is condensed by the lens 151 and to be incident into the core 161 of the multimode optical fiber 16.

Incidentally, in FIG. 4 and FIG. 5, a vertical-cavity surface-emitting laser driven by direct modulation is used as the laser 14; however, the present embodiment is not limited thereto and various types of lasers may be used. For example, a distributed feedback laser diode (DFB-LD) may be used as the laser 14.

Figure 6:
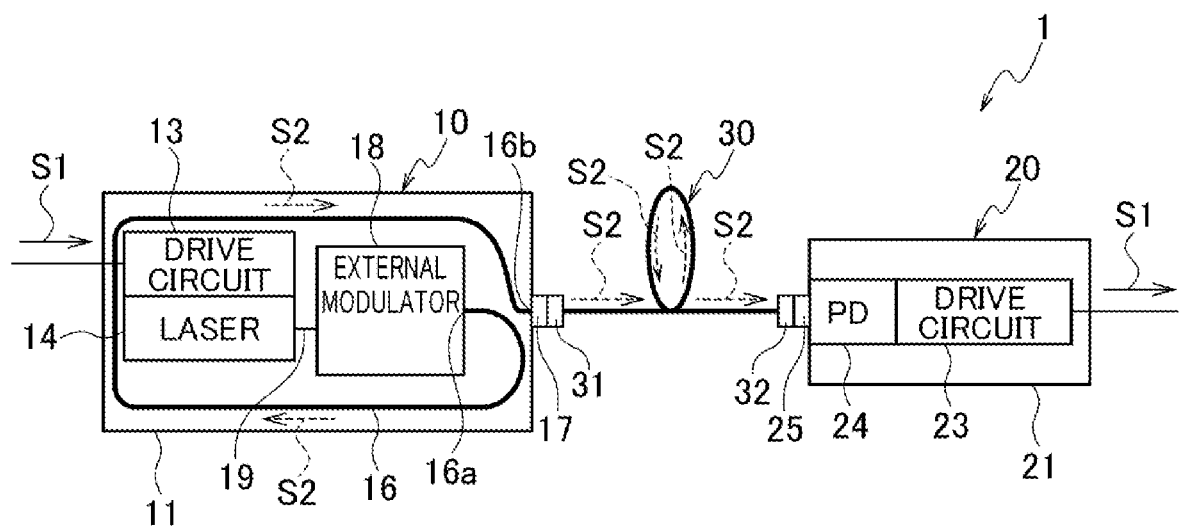
FIG. 6 is a diagram schematically illustrating a modified example of an optical transmission system.
Figure 7:
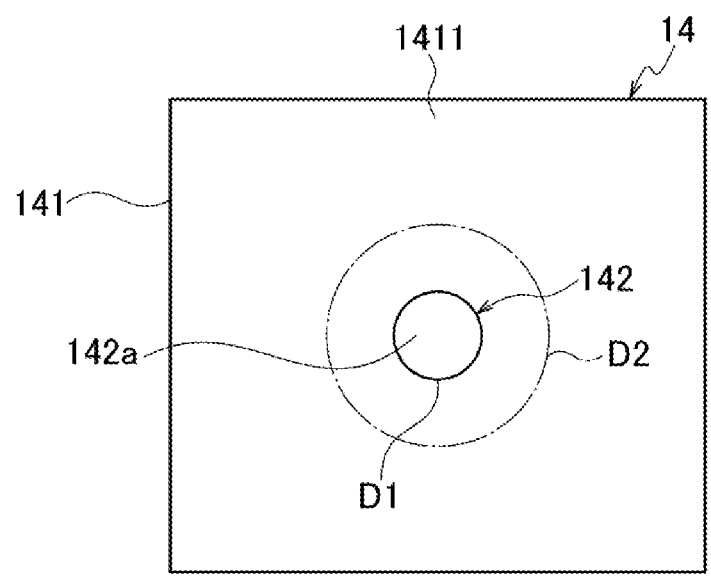
FIG. 7 is a diagram schematically illustrating the distribution of the intensity of light in the light emitting part when light is emitted from the light emitting part and the distribution of the intensity of return light to the light emitting part.
Figure 8:
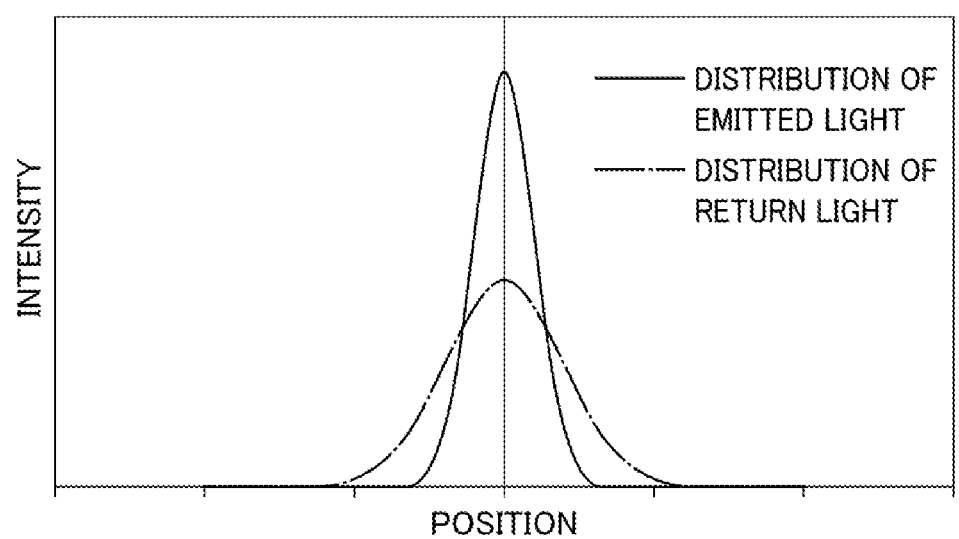
FIG. 8 is a diagram illustrating the distribution of the intensity of light in the light emitting part when light is emitted from the light emitting part, and the distribution of the intensity of return light to the light emitting part, in a normally distributed state.

As illustrated in FIG. 6, it is also possible to perform modulation using an external modulator 18, instead of direct modulation performed by the laser 14. That is, it is also possible to have the optical signal S2 that is emitted from the emission surface 142*a* be transmitted to the external modulator 18 via a waveguide 19, and to have the optical signal S2 that is modulated by the external modulator 18 be incident on the core 161 of the multimode optical fiber 16. Accordingly, the modulation is performed using the external modulator 18, which allows faster modulation than when the laser 14 preforms modulation directly. As a result, the system can have a configuration that is more suitable for long-distance and high-capacity communications.

In the present embodiment, it is possible to suppress the deterioration of signal quality by reducing the return light to the laser 14 side.

Specifically, the return light to the laser 14 is reduced by breaking the correlation between the distribution D1 of the intensity of the optical signal S2 emitted from the laser 14 and the distribution D2 of the intensity of the return light to the laser 14 (worsening the correlation), and by changing the distribution D2 of the intensity of the return light to the laser 14.

In the present embodiment, a coefficient R of the correlation between the distribution D1 and the distribution D2 is set to 0.5 or less (0 or more to 0.5 or less). This makes it possible to further reduce the return light to the laser 14, and reduce the influence of the return light to the laser 14 side on the noise characteristics (RIN: relative intensity noise).

Here, the coefficient R of the correlation between the distribution D1 and the distribution D2 can be obtained as follows. First, using the distribution D1 of the intensity of the optical signal S2 that is emitted from the emission surface 142*a* of the laser 14, the distribution of the intensity of the emitted light (optical signal S2) for each position is converted to a normal distribution. Similarly, using the distribution D2 of the intensity of the return light on one surface 1411 of the main body 141 of the laser 14, the distribution of the intensity of the return light for each position is converted to a normal distribution.

Next, normalization is performed such that the standard deviation of the normal distribution of the emitted light (optical signal S2) is set to 1 in a state in which the relationship of the normal distribution of the emitted light (optical signal S2) and the return light is maintained. For example, in a case where the normal distribution of the emitted light has a standard deviation of 0.005 mm and the normal deviation of the return light has a standard deviation of 0.01 mm, when the standard deviation of the normal distribution of the emitted light is set to 1, the standard deviation of the normal distribution of the return light becomes 2.

Next, in a state in which the normal distribution of the emitted light is normalized, the Euclidean distance d is obtained from the difference in intensity at each position x (the difference between the power ax of the emitted light and the power bx of the return light) in the normal distribution of the emitted light (optical signal S2) and the normal distribution of the return light. Specifically, the Euclidean distance d is calculated by the following formula.

$$d = \sqrt{\Sigma(a_x - b_x)^2} \quad \text{[Math. 1]}$$

Accordingly, for example, when the normal distribution of the emitted light has a standard deviation of 0.005 mm and when the normal distribution of the return light has a standard deviation of 0.01 mm, the Euclidean distance d is 1.6.

Thereafter, the correlation between the two distributions is observed by modulating the Euclidean distance d obtained in this way. Specifically, the coefficient R of the correlation is obtained by calculating $1/(1+d)$. For example, when the normal distribution of the emitted light has a standard deviation of 0.005 mm and when the normal distribution of the return light has a standard deviation of 0.01 mm, the coefficient R of the correlation is 0.4.

The coefficient R of this correlation necessarily becomes smaller when the mode coupling coefficient of the multimode optical fiber that is optically coupled to the lens 151 increases.

Therefore, in the present embodiment, the coefficient R of the correlation is set to 0.5 or less by using the multimode optical fiber 16 which has a mode coupling coefficient higher than that of the ordinary multimode optical fiber.

Figure 9:
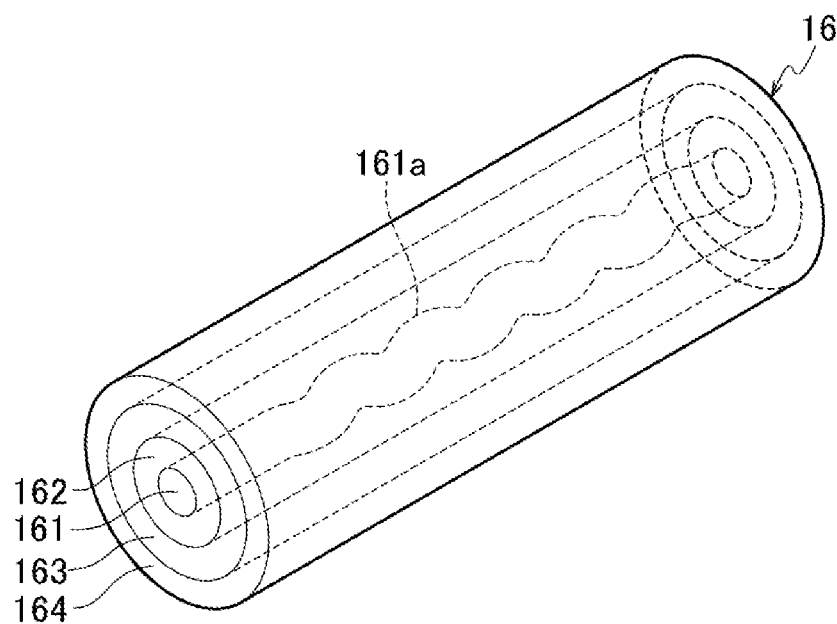
FIG. 9 is a diagram schematically illustrating a microbend part of the multimode optical fiber.

Specifically, as illustrated in FIG. 9, the core 161 of the multimode optical fiber 16 is configured to have a microbend part 161*a* that is bent with a radius of curvature smaller than the diameter of the core 161. This increases the mode coupling coefficient of the multimode optical fiber 16.

There are various methods for forming the microbend part 161*a*. For example, the microbend part 161*a* can be formed in the core 161 by shrinking the jacket 164 using heat or the like when manufacturing the multimode optical fiber 16. In addition, the microbend part 161*a* can be formed in the core 161 by applying side pressure. In this respect, when the microbend part 161*a* is formed in the core 161, the loss of light may increase, and thus it is preferable to form the microbend part 161*a* such that mode coupling is caused but that the loss of light does not cause a problem.

Thus, when using the multimode optical fiber 16 in which microbending has been caused, the mode coupling coefficient of the optical fiber that is used in the optical transmitter 10 is higher than usual. This makes it possible to increase the mode coupling coefficient with a simple configuration, thereby improving the signal quality of the optical transmitter 10.

Although the microbend part 161*a* can be formed in both a quartz glass core 161 and a plastic core 161, plastic deformation may occur in a plastic core 161. For this reason, when forming the microbend part 161*a* in the core 161, it is preferable to use a multimode optical fiber 16 having a core 161 that is made of quartz glass.

Further, the core 161 of the multimode optical fiber 16 may be configured to scatter the optical signal S2, thereby increasing the mode coupling coefficient of the multimode optical fiber 16.

Specifically, a refractive index fluctuation is caused in the core 161 of the multimode optical fiber 16, that is, the refractive index in a certain area of the core 161 is shifted from the normal refractive index, and thus the core 161 of the multimode optical fiber 16 is configured to scatter the optical signal S2 passing into the core 161. Such a configuration can be possible even when the core 161 is made of quartz glass or plastic.

When the light scattering becomes Rayleigh scattering, the loss of light increases. For this reason, it is preferable to change the refractive index fluctuation from submicrons to microns in size, and to cause, for example, Mie scattering in which scattering toward the rear side or lateral side decreases. This makes it possible to increase scattering toward the front side, thereby making it possible to further reduce the loss of light.

Accordingly, when using the multimode optical fiber 16 with increased light scattering, the mode coupling coefficient of the optical fiber that is used in the optical transmitter 10 is higher than usual. This makes it possible to increase the mode coupling coefficient with a simple configuration, thereby improving the signal quality of the optical transmitter 10.

It is also possible to increase light scattering in a state in which the microbend part 161a is formed in the core 161 of the multimode optical fiber 16.

In order to cause mode coupling, the multimode optical fiber 16 is required to have a certain length. For example, the multimode optical fiber 16 needs to have a length of 0.1 m or longer.

Figure 10:
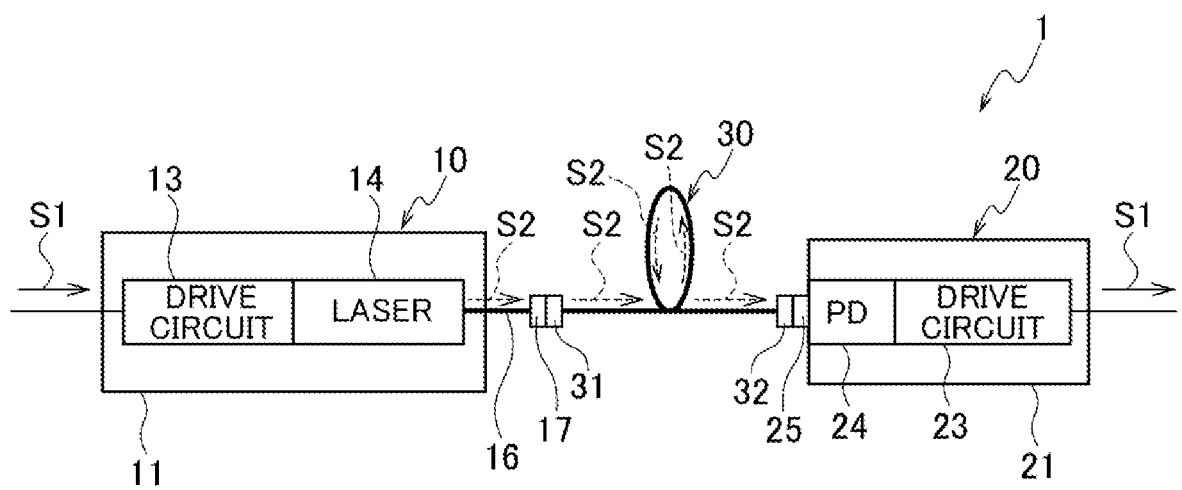
FIG. 10 is a diagram schematically illustrating another modified example of an optical transmission system.

For this reason, as illustrated in FIG. 10, for example, it is possible to adopt an optical transmitter 10 in a pigtail shape in which the multimode optical fiber 16 is taken out of the case 11 and the optical connector 17 is arranged opposite to the laser 14. In this case, it is preferable for the multimode optical fiber 16 to have a length of 3.0 m or less from the viewpoint of handling.

It is also possible for the multimode optical fiber 16 in a bent state to be arranged in the case 11. This makes it possible to cause mode coupling more reliably without increasing the case 11 in size, thereby reducing the optical transmitter 10 in size and improving the signal quality of the optical transmitter 10 more reliably.

In order for the multimode optical fiber 16 to have a size that is suitable for the case 11, it is preferable for the multimode optical fiber 16 to have a length of 0.5 m or less.

The other end 16b of the multimode optical fiber 16 is optically coupled to the optical connector 17 that is attached in such a way as to be exposed from the case 11. Accordingly, the optical signal S2 is transmitted from the optical connector 17 to the outside of the optical transmitter 10 via the multimode optical fiber 16 in which the mode coupling coefficient is enhanced.

By forming the optical transmission system 1 with the optical transmitter 10 having a high signal quality, the signal quality of the optical transmission system 1 can be improved without using an optical isolator.

In the present embodiment, as described above, the optical transmission system 1 is formed by connecting the optical receiver 20 to the optical transmitter 10 via the optical fiber 30.

The optical receiver 20 that is connected to the optical transmitter 10 at this time includes a case 21 in which the photodiode 24 and the drive circuit 23 described above are housed. The photodiode 24 and the drive circuit 23 are electrically connected with each other by being mounted on a substrate (not illustrated).

In addition, an optical connector 25 is attached to the outside of the case 21 in an exposed state. The optical connector 25 is optically coupled to the photodiode 24, and the optical signal S2 that is transmitted by the optical fiber 30 is transmitted to the photodiode 24 via the optical connector 25 by coupling the optical fiber 30 to the optical connector 25.

The optical fiber 30 is optically coupled to the optical connector 17 via a first optical connector part 31, and optically coupled to the optical connector 25 via a second optical connector part 32.

At this time, a multimode optical fiber having a high mode coupling coefficient may be used as the optical fiber 30 for optically coupling the optical transmitter 10 and the optical receiver 20 with each other in the same manner as the multimode optical fiber 16. In addition, a general optical fiber (a multimode optical fiber or a single-mode optical fiber that does not increase the mode coupling coefficient) can be used as the optical fiber 30. That is, any type of optical fiber can be used as an optical fiber that is coupled to the multimode optical fiber 16 that is provided in the optical transmitter 10.

However, when a multimode optical fiber having a high mode-coupling coefficient is used as the optical fiber 30, the transmission distance needs to be reduced due to a large optical loss or a large bandwidth.

In contrast, when a general optical fiber is used as the optical fiber 30, noise can be suppressed and transmission can be performed over a relatively long distance (for example, about 200 m depending on the transmission speed). Since the optical transmission system 1 according to the present embodiment is a transmission system using a multimode optical fiber, the whole system is intended for transmission over a relatively short distance of several meters to several hundred meters.

The optical transmission system 1 according to the present embodiment makes it possible to improve the signal quality in the transmission of digital signals, and has the effect of further improving the signal quality in a system that transmits radio frequency (RF) signals, such as radio on fiber (RoF), which are susceptible to noise.

It is preferable that the core diameter of the optical fiber 30 be approximately equal to that of the multimode optical fiber 16.

[Function and Effect]

In the following description, the characteristic configuration of the optical transmitter and the optical transmission system described in the above embodiment and in the modified example thereof, and the effect obtained therefrom, will be described.

The optical transmitter 10 illustrated in the above embodiment and in the modified example thereof includes: the laser (light emitting part) 14 that emits the optical signal (light) S2; and the lens 151 that condenses the optical signal (light) S2 emitted from the laser (light emitting part) 14. In addition, the optical transmitter 10 includes the multimode optical fiber 16 that is optically coupled to the lens 151 at one end 16a and on which the optical signal (light) S2 that is condensed by the lens 151 is incident.

Further, the coefficient R of the correlation between the distribution D1 of the intensity of the optical signal (light) S2 in the laser (light emitting part) 14 and the distribution D2 of the intensity of the return light to the laser (light emitting part) 14, when the optical signal (light) S2 is emitted from the laser (light emitting part) 14, is set to 0.5 or less.

In addition, the optical transmission system 1 illustrated in the above embodiment and in the modified example thereof includes: the above optical transmitter 10; the optical receiver 20 that receives the optical signal S2 that is transmitted from the optical transmitter 10; and the optical fiber 30 that transmits the optical signal S2 that is transmitted from the optical transmitter 10, to the optical receiver 20.

Accordingly, by breaking the correlation between the distribution D1 of the intensity of the optical signal S2 emitted from the laser 14 and the distribution D2 of the intensity of the return light to the laser 14, the distribution D2 of the intensity of the return light to the laser 14 changes, thereby making it possible to reduce the return light to the laser 14 to some extent. At this time, when the coefficient R of the correlation between the distribution D1 and the distribution D2 is set to 0.5 or less, the return light to the laser 14 can be further reduced. As a result, the influence of the return light to the laser 14 side on the noise characteristics (RIN: relative intensity noise) can be reduced. For this reason, the signal quality of the optical transmission system 1 can be improved without using an optical isolator.

Therefore, the configuration illustrated in the above embodiment and in the modified example thereof makes it possible to acquire the optical transmitter 10 and the optical transmission system 1 being capable of achieving a reduction in size and cost and of having a high signal quality.

Further, the optical transmitter 10 having a high signal quality makes it possible to reduce noise even when the light is excited in a predetermined mode. For this reason, even when a laser having many low-order modes (a laser with much return light) is used as the laser 14, it is possible to achieve return light that is equivalent to that of a laser with many high-order modes (a laser with little return light).

When the optical transmitter 10 having a high signal quality is used, it is possible to achieve the optical transmission system 1 having a high signal quality even in a system that transmits radio frequency (RF) signals such as radio on fiber (RoF) that are susceptible to noise.

In addition, the optical transmitter 10 may include the case 11 in which the multimode optical fiber 16 is housed, and the optical connector 17 that is attached to the case 11 and connected to the optical fiber 30 outside the case 11. Further, the multimode optical fiber 16 may be optically coupled to the optical connector 17 at the other end 16*b* in a state in which the multimode optical fiber 16 is arranged bent in the case 11.

For example, when the coefficient R of the correlation between the distribution D1 and the distribution D2 is set to 0.5 or less by using the multimode optical fiber 16 having a higher mode coupling coefficient than usual, the multimode optical fiber 16 needs to be increased in length to some extent in order to cause mode coupling. At this time, when the multimode optical fiber 16 is bent to be arranged in the case 11, mode coupling can be caused more reliably without increasing the case 11 in size. As a result, it is possible to realize the optical transmitter 10 that is capable of achieving a reduction in size and of having a high signal quality more reliably.

In addition, the core 161 of the multimode optical fiber 16 may have the microbend part 161*a* that is bent with a radius of curvature smaller than the diameter of the core 161.

Accordingly, the mode coupling coefficient of the optical fiber that is used in the optical transmitter 10 is higher than usual by simply replacing the optical fiber used in the optical transmitter 10 with the multimode optical fiber 16 in which microbending has been caused. That is, the coefficient R of the correlation between the distribution D1 and the distribution D2 in the optical transmitter 10 is set to 0.5 or less by simply replacing the optical fiber that is used in the optical transmitter 10 with the multimode optical fiber 16 in which microbending has been caused. This makes it possible to increase the mode coupling coefficient with a simple configuration, thereby improving the signal quality of the optical transmitter 10.

In addition, the core 161 of the multimode optical fiber 16 may be configured to scatter the optical signal (light) S2.

Accordingly, the mode coupling coefficient of the optical fiber that is used in the optical transmitter 10 is higher than usual simply by forming a configuration that causes light scattering in the core 161 of the multimode optical fiber 16. That is, the coefficient R of the correlation between the distribution D1 and the distribution D2 in the optical transmitter 10 is set to 0.5 or less simply by forming a configuration that causes light scattering in the core 161 of the multimode optical fiber 16. This makes it possible to increase the mode coupling coefficient with a simple configuration, thereby improving the signal quality of the optical transmitter 10.

[Other Matters]

Although the present embodiment has been described as above, the present embodiment is not limited to these configurations and various modifications are possible within the scope of the gist of the present embodiment.

For example, the configurations described in the above embodiment and in the modified example thereof may be combined as appropriate.

In the above embodiment and in the modified example thereof, a description has been given regarding an example in which the core diameter of the multimode optical fiber 16 is equal to the core diameter of the optical fiber 30. However, the core diameter of the multimode optical fiber 16 is not necessarily equal to the core diameter of the optical fiber 30, and the core diameter of the multimode optical fiber 16 may be different from the core diameter of the optical fiber 30.

In addition, although one optical fiber 30 is used as an example in the above embodiment and in the modified example thereof, the number of optical fibers used in the optical transmission system 1 is not limited to one. For example, a plurality of optical fibers that are connected with an optical connector may be used.

In addition, the specifications (shape, size, layout, etc.) of the multimode optical fiber, light emitting part, and other particulars may also be changed as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An optical transmitter comprising:
a light emitting part that emits light;
a lens that condenses the light emitted from the light emitting part; and a multimode optical fiber that is optically coupled to the lens at one end and on which the light that is condensed by the lens is incident, wherein a coefficient of a correlation between a distribution of an intensity of the light in the light emitting part and a distribution of an intensity of return light to the light emitting part, when the light is emitted from the light emitting part, is set to 0.5 or less.

2. The optical transmitter according to claim 1, further comprising:

a case in which the multimode optical fiber is housed; and an optical connector that is attached to the case and connected to an optical fiber outside the case, wherein the multimode optical fiber is optically coupled to the optical connector at another end in a state in which the multimode optical fiber is arranged bent in the case.

3. The optical transmitter according to claim 1, wherein a core of the multimode optical fiber has a microbend part that is bent with a radius of curvature smaller than a diameter of the core.

4. The optical transmitter according to claim 1, wherein a core of the multimode optical fiber is configured to scatter the light.

5. An optical transmission system comprising:

an optical transmitter described in claim 1;

an optical receiver that receives light that is transmitted from the optical transmitter; and an optical fiber that transmits the light that is transmitted from the optical transmitter, to the optical receiver.

6. The optical transmitter according to claim 1, wherein the distribution of the intensity of the light in the light emitting part comprises a standard deviation of 0.005 mm, and the distribution of the intensity of the return light to the light emitting part comprises a standard deviation of 0.01 mm.

7. The optical transmitter according to claim 6, wherein a Euclidean distance, of a difference in the intensity of the light in the light emitting part at each position in the distribution of the intensity of the light in the light emitting part and the distribution of the intensity of the return light, is 1.6.

8. The optical transmitter according to claim 7, wherein the coefficient is 0.4.

9. The optical transmitter according to claim 3, wherein the multimode optical fiber further comprises a jacket surrounding the core, and the microbend part is bent with the radius of curvature smaller than the diameter of the core by the jacket being heat shrunk moreso at the microbend part than at other parts of the multimode optical fiber.

10. The optical transmitter according to claim 6, wherein the core consists of quartz glass.

* * * * *